US011765280B2

(12) United States Patent
Kodama

(10) Patent No.: US 11,765,280 B2
(45) Date of Patent: Sep. 19, 2023

(54) IMAGE-FORMING APPARATUS, INFORMATION PROCESSING SYSTEM, AND CONTROL METHOD FOR CHANGING BEHAVIOR OF THE IMAGE-FORMING APPARATUS BY DETECTING, APPROACH, OR LEAVING OF PORTABLE DEVICE TERMINAL

(71) Applicant: SHARP KABUSHIKI KAISHA, Sakai (JP)

(72) Inventor: Hirotaka Kodama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/563,797

(22) Filed: Dec. 28, 2021

(65) Prior Publication Data

US 2022/0217239 A1 Jul. 7, 2022

(30) Foreign Application Priority Data

Jan. 7, 2021 (JP) ................................. 2021-001573

(51) Int. Cl.
*H04N 1/00* (2006.01)
(52) U.S. Cl.
CPC ....... *H04N 1/00082* (2013.01); *H04N 1/0001* (2013.01); *H04N 1/00037* (2013.01); *H04N 1/00204* (2013.01); *H04N 1/00514* (2013.01); *H04N 1/00517* (2013.01); *H04N 1/00896* (2013.01)

(58) Field of Classification Search
CPC ............ H04N 1/00082; H04N 1/0001; H04N 1/00037; H04N 1/00204; H04N 1/00514; H04N 1/00517; H04N 1/00891; H04N 1/00896; H04N 2201/0094; H04N 2201/0075; G06K 15/4055; G06K 15/406; G06F 3/1292
USPC .......................................................... 358/1.15
See application file for complete search history.

(56) References Cited

U.S. PATENT DOCUMENTS

| | | | |
|---|---|---|---|
| 2013/0329253 A1* | 12/2013 | Sasaki | H04N 1/00222 358/1.15 |
| 2017/0013155 A1* | 1/2017 | Yokoyama | H04N 1/00411 |
| 2018/0160286 A1* | 6/2018 | Oh | H04N 1/00127 |
| 2018/0349081 A1* | 12/2018 | Kanamaru | G06F 3/1203 |

FOREIGN PATENT DOCUMENTS

| | | |
|---|---|---|
| WO | 2008/117785 A1 | 10/2008 |
| WO | 2016/103499 A1 | 6/2016 |

\* cited by examiner

*Primary Examiner* — Kent Yip
(74) *Attorney, Agent, or Firm* — ScienBiziP, P.C.

(57) ABSTRACT

An image-forming apparatus comprising a controller and a communicator, wherein the controller is configured to perform to detect distance information of the image-forming apparatus with respect to a portable terminal device possessed by a user based on communication with the portable terminal device using the communicator, detect, based on the detected distance information, approach or leaving of specific portable terminal devices possessed by at least one or more predetermined users to or from the image-forming apparatus, and change a behavior of the image-forming apparatus when the controller detects the approach or the leaving of the specific portable terminal device to or from the image-forming apparatus.

9 Claims, 5 Drawing Sheets

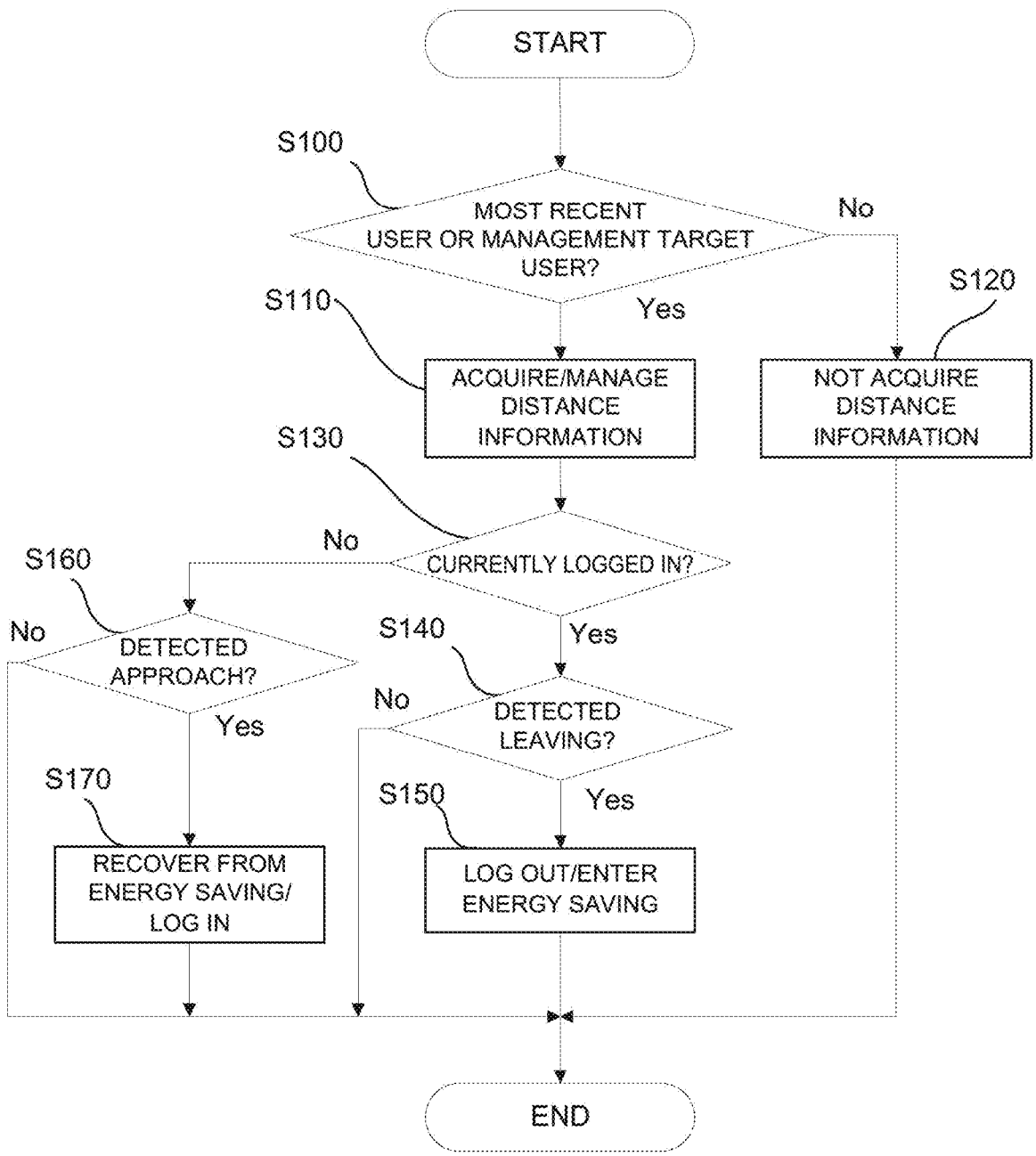

IMAGE-FORMING APPARATUS, INFORMATION PROCESSING SYSTEM, AND CONTROL METHOD FOR CHANGING BEHAVIOR OF THE IMAGE-FORMING APPARATUS BY DETECTING, APPROACH, OR LEAVING OF PORTABLE DEVICE TERMINAL

BACKGROUND OF THE INVENTION

Field of the Invention

The present disclosure relates to an image-forming apparatus, and the like.

Description of the Background Art

In a multifunction peripheral (MFP), or the like, having various functions as an image-forming apparatus, there is a technology to change the behavior of the image-forming apparatus in accordance with a movement of a user.

Conventionally, a printing control system is disclosed, which measures the distance between a browsing terminal (portable terminal device) displaying content and a printing device, requests the browsing terminal to transmit the content when the distance from the browsing terminal becomes less than a first predetermined distance, and starts printing when the distance from the browsing terminal becomes less than a second predetermined distance (see WO2008/117785).

However, simply detecting the movement of the user by using a communication function of the portable terminal device does not achieve an efficient operation as the image-forming apparatus may operate by detecting the movement of the user who has no intention to use the image-forming apparatus, depending on the installation location of the image-forming apparatus, the location of the user's desk, etc.

In view of such a circumstance, the present disclosure provides an image-forming apparatus and the like that reduces the detection of movement of a user who has no intention to use so as to achieve an efficient operation.

SUMMARY OF THE INVENTION

The present disclosure is an image-forming apparatus comprising a controller and a communicator, wherein the controller is configured to perform to detect distance information of the image-forming apparatus with respect to a portable terminal device possessed by a user based on communication with the portable terminal device using the communicator, detect, based on the detected distance information, approach or leaving of specific portable terminal devices possessed by at least one or more predetermined users to or from the image-forming apparatus, and change a behavior of the image-forming apparatus when the controller detects the approach or the leaving of the specific portable terminal device to or from the image-forming apparatus.

The present disclosure is an information processing system comprising a portable terminal device and an image-forming apparatus, wherein the image-forming apparatus includes a controller and a communicator, wherein the controller is configured to perform to detect distance information of the image-forming apparatus with respect to a portable terminal device possessed by a user based on communication with the portable terminal device using the communicator, detect, based on the detected distance information, approach or leaving of specific portable terminal devices possessed by at least one or more predetermined users to or from the image-forming apparatus, and change a behavior of the image-forming apparatus when the controller detects the approach or the leaving of the specific portable terminal device to or from the image-forming apparatus.

The present disclosure is a method for controlling an image-forming apparatus, the method comprising detecting distance information of the image-forming apparatus with respect to a portable terminal device possessed by a user based on communication with the portable terminal device, detecting, based on the detected distance information, approach or leaving of specific portable terminal devices possessed by at least one or more predetermined users to or from the image-forming apparatus, and changing a behavior of the image-forming apparatus when the approach or the leaving of the specific portable terminal device to or from the image-forming apparatus is detected.

With the image-forming apparatus according to the present invention, based on the detected distance information, the approach or leaving of specific portable terminal devices possessed by at least one or more predetermined users to or from the image-forming apparatus is detected, and when the approach or leaving of the specific portable terminal device to or from the image-forming apparatus is detected by the approach detector, the behavior of the image-forming apparatus is changed; thus, only the distance information of the portable terminal devices possessed by at least one or more predetermined users who used the image-forming apparatus is managed so that it is possible to produce a desired effect of effectively preventing unnecessary behavior changes due to the approach or leaving of a user other than the distance-information management target user.

BRIEF DESCRIPTION OF THE DRAWINGS

FIG. 4 is a control flowchart.

DESCRIPTION OF THE PREFERRED EMBODIMENTS

An embodiment for carrying out the present disclosure will be described below with reference to the drawings.

The embodiment below is an example for describing the present disclosure, and the technical scope of the invention described in claims is not limited to the description below.

1. Embodiment

1.1 Overall Configuration

Figure 1:
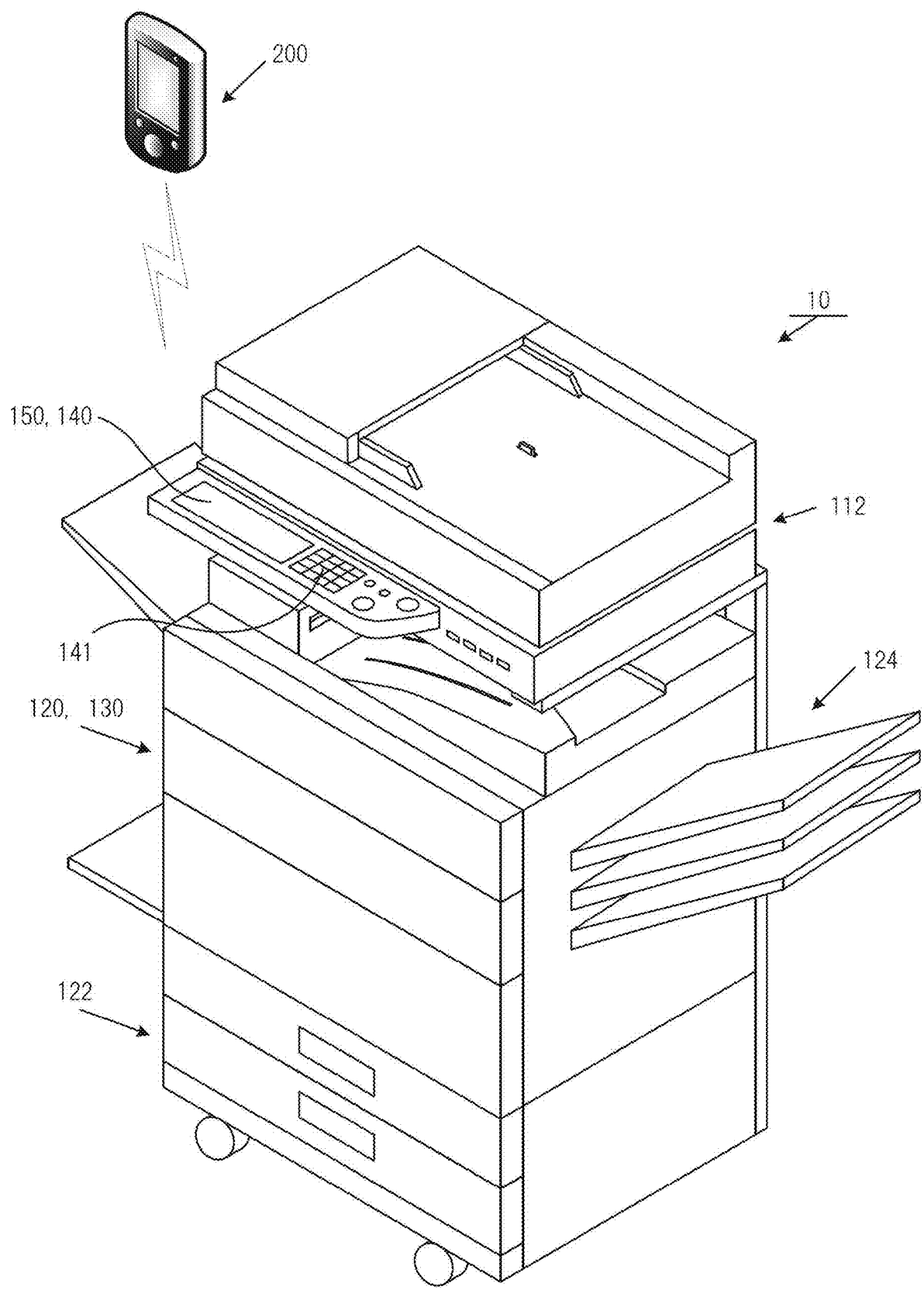
FIG. 1 is an external view of an image-forming apparatus according to an embodiment.

As illustrated in FIG. 1, an image-forming apparatus 10 according to an embodiment is used by a user who possesses a portable terminal device 200.

As illustrated in FIG. 1, the image-forming apparatus 10 is a multifunction printer (MFP) having a plurality of functions of a duplicator, a copier, a scanner, and the like, to read an image of a document by a document reader 112 in an upper portion of the image-forming apparatus 10 and output the image by an electrophotographic system.

The image-forming apparatus 10 performs an operation to change the behavior of the image-forming apparatus 10 in accordance with the movement of a user, i.e., recognizes the information on the distance from the portable terminal device 200, such as a mobile terminal possessed by a user, having an approach communication function, detects the approach or leaving of the specific portable terminal devices 200 possessed by at least one or more predetermined users to or from the image-forming apparatus 10 and thus detects the approach or leaving of the user, and recovers from an energy-saving state to a normal state or logs in/out.

1.2 Functional Configuration

Figure 2:
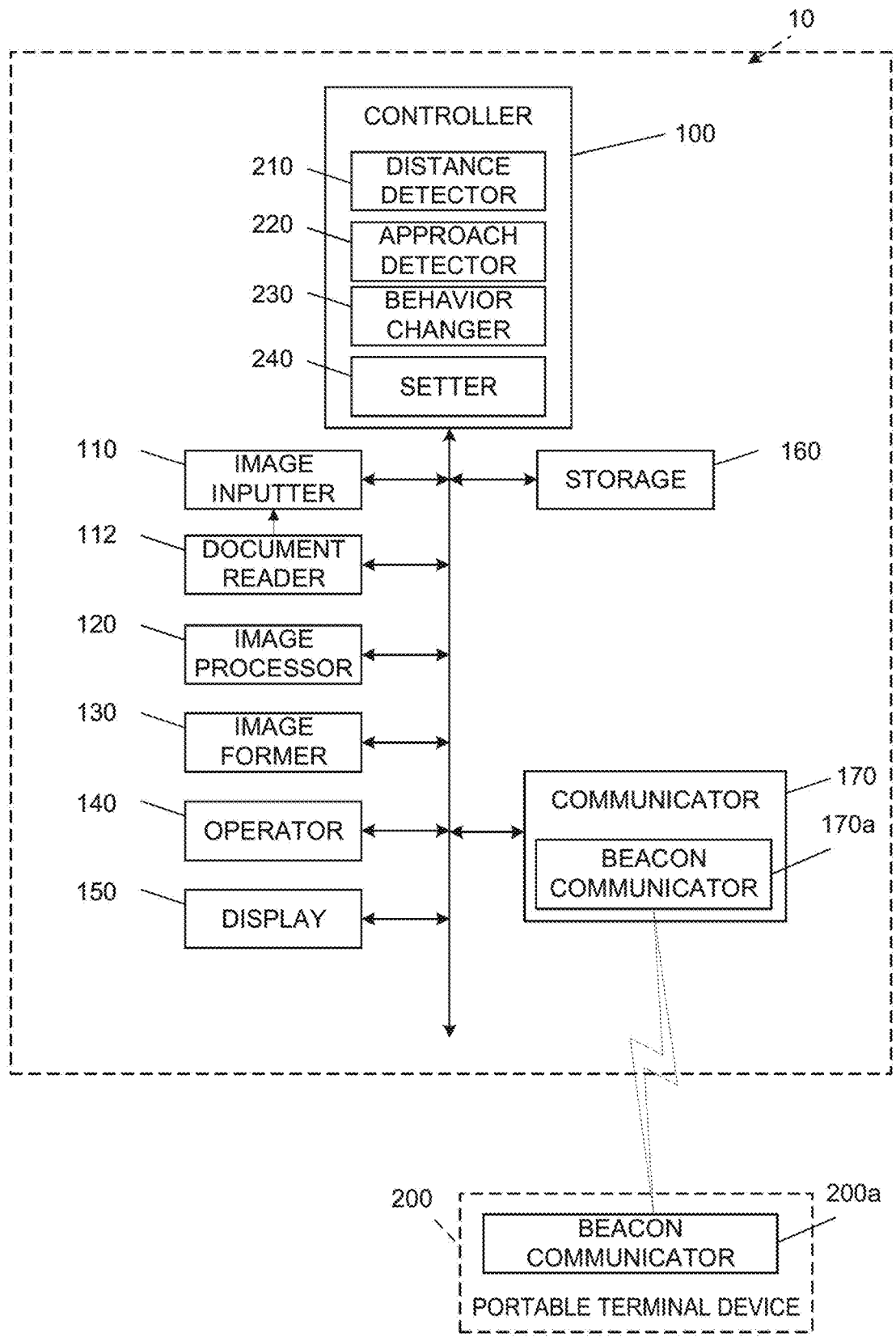
FIG. 2 is a control block diagram of the image-forming apparatus.

As illustrated in FIG. 2, the image-forming apparatus 10 primarily includes a controller 100, an image inputter 110, the document reader 112, an image processor 120, an image former 130, an operator 140, a display 150, a storage 160, and a communicator 170.

The controller 100 is a functional section that controls the overall image-forming apparatus 10.

The controller 100 reads and executes various programs to perform various functions and includes, for example, one or more arithmetic devices (e.g., a central processing units (CPUs)).

The image inputter 110 is a functional section that inputs image data to the image-forming apparatus 10. The image inputter 110 is coupled to the document reader 112, which is a functional section that reads an image of a document, to input image data that is output from the document reader 112.

The image inputter 110 may input image data from a storage medium such as a USB memory or an SD card. The image inputter 110 may input image data from another terminal device via the communicator 170 that establishes a connection with another terminal device.

The document reader 112 has a function to optically read a document placed on a contact glass (not illustrated), or the like, and deliver the generated image data to the image processor 120.

The image former 130 is a functional section that forms, on a recording medium (e.g., recording sheet), output data based on the image data. For example, as illustrated in FIG. 1, the recording sheet is fed from a sheet feed tray 122, and after an image is formed on a surface of the recording sheet by the image former 130, the recording sheet is ejected to a sheet ejection tray 124. The image former 130 includes, for example, a laser printer that uses an electrophotographic system.

The image processor 120 has a function to perform image processing to convert the image data read by the document reader 112 into a set file format (TIFF, GIF, JPEG, etc.). Then, an output image is formed based on the image data on which the image processing has been performed.

The operator 140 is a functional section that receives an operation instruction by a user and includes various key switches, a device that detects an input by contact, etc. The user inputs, via the operator 140, the function to be used and an output condition.

The display 150 is a functional section that displays various types of information to the user and includes, for example, a liquid crystal display (LCD).

Specifically, the operator 140 provides a user interface for operating the image-forming apparatus 10, and the display 150 presents various setting menu screens and messages of the image-forming apparatus.

As illustrated in FIG. 1, the image-forming apparatus 10 may include, as the configuration of the operator 140, a touch panel that is an integrated combination of an operation panel 141 and the display 150. In this case, the method for detecting an input of the touch panel may be a typical detection method, such as a resistive method, an infrared method, an inductive method, or a capacitive method.

The storage 160 is a functional section that stores various programs including a control program needed for an operation of the image-forming apparatus 10, various data including read data, and user information. The storage 160 includes, for example, a non-volatile read only memory (ROM), a random access memory (RAM), and a hard disk drive (HDD). A solid state drive (SSD), which is a semiconductor memory, may be included.

The communicator 170 provides a communication connection with an external device. A communication interface (communication I/F) used for transmitting and receiving data is provided as the communicator 170.

In accordance with a user operation at the image-forming apparatus 10, the communication I/F allows the data stored in the storage of the image-forming apparatus 10 to be transmitted to and received by another computer device connected via a network.

The communicator 170 includes, as a communication interface, a beacon communicator 170a that wirelessly communicates with the portable terminal device 200 possessed by the user. The beacon communicator 170a is a communication device that realizes wireless communication by connecting to the portable terminal device 200 based on controlling by the controller 100. For example, the beacon communicator 170a is an antenna for transmitting and receiving a wireless signal by Bluetooth (registered trademark: the same applies hereinafter) or an integrated circuit (IC) including the antenna. Or the beacon communicator 170a may be (1) an antenna for transmitting and receiving a wireless signal of a wireless communication (for example, wireless LAN (local area network) or NFC (near field communication)), or (2) an integrated circuit including the antenna.

The portable terminal device 200 is a terminal device that may be carried around, including what is called a tablet terminal, a smartphone, and the like, and includes a beacon communicator 200a that transmits and receives beacon signals. The beacon communicator 200a is an antenna for transmitting and receiving a wireless signal or an integrated circuit (IC) including the antenna, similarly to the beacon communicator 170a of the image forming apparatus 10. The beacon communicator 200a is wirelessly linked to the beacon communicator 170a of the communicator 170 in the image-forming apparatus 10 so as to transmit and receive beacon signals, and the image-forming apparatus 10 is configured to detect the distance information about the image-forming apparatus 10 and the portable terminal device 200 with the beacon signals (a distance detector 210) and detect the approach or leaving of the portable terminal device 200 to or from the image-forming apparatus 10 based on the detected distance information (an approach detector 220).

In the image-forming apparatus 10, the controller 100 implements the respective functions of the distance detector 210, the approach detector 220, a behavior changer 230, a setter 240, and the like, in accordance with a program stored in the storage 160.

The distance detector 210 detects the distance information of separation between the portable terminal device 200 possessed by the user and the image-forming apparatus 10. For example, the distance information may be detected by a location determination system in which the portable terminal device 200 uses, as the beacon signals, Bluetooth beacon signals. It is suitable to use, as the portable terminal device 200, a smartphone or a tablet terminal using beacon signals based on a Bluetooth Low Energy (BLE) standard, which enables communications with extremely low power consumption.

The communicator 170 (the beacon communicator 170a) of the image-forming apparatus 10 transmits and receives beacon signals of the BLE standard to and from the portable terminal device 200 (the beacon communicator 200a) so as to detect the distance between the portable terminal device 200 and the image-forming apparatus 10 (see, for example, WO2016/103499). For example, the distance detector 210 detects the distance to the portable terminal device 200 based on (1) content of the beacon signal transmitted from the portable terminal device 200 and/or (2) a radio wave strength in communication with the portable terminal device 200. For the distance detection, not only the beacon signals of the BLE standard but also terminal devices capable of measuring the distance using a wireless LAN or infrared rays may also be used. In this way, the distance detector 210 detects the distance to the portable terminal device 200 based on the communication with the portable terminal device 200 using the beacon communicator 170a.

The approach detector 220 detects, based on the detected distance information, approach or leaving of the specific portable terminal devices 200 possessed by a plurality of predetermined users to or from the image-forming apparatus 10 and refrains from detecting approach or leaving of the portable terminal device possessed by a user other than the predetermined user to or from the image-forming apparatus 10.

The behavior changer 230 changes the behavior of the image-forming apparatus 10 when the approach detector 220 determines that the specific portable terminal device 200 has approached or left from the image-forming apparatus 10.

The setter 240 sets a plurality of predetermined users based on a usage history of the image-forming apparatus 10 or sets a user for which the distance information is managed regardless of the presence or absence of the usage history.

The setter 240 may make a determination based on, as the usage history of the image-forming apparatus 10, for example the most recent number of uses of the image-forming apparatus 10 when at least one or more predetermined users approach or leave from the image-forming apparatus 10.

Here, the setter 240 may set a limit on the number of predetermined users or the time for managing the usage history. It is suitable to limit the predetermined users to only a plurality of (e.g., 2 to 10) users who used the image-forming apparatus most recently (e.g., about an hour earlier) from the usage history and to repeatedly acquire the most recent usage history of the limited number of users. When there is no limit on the number of persons or the management time, the memory storing the usage history of the user is continuously consumed, but setting a limit may prevent unnecessary consumption of a memory capacity and may ensure a memory capacity.

The predetermined user may be set based on the size of the installation location of the image-forming apparatus, the number of users, the frequency of use, etc. For the limit set on the time for managing the usage history, the setting time may be automatically changed in accordance with the frequency of use of the image-forming apparatus (for example, the setting time is automatically changed within work hours and out of work hours). Alternatively, a fixed setting time may be used for management. The number of persons to be registered as the predetermined users may be some percentage of the total number of users, or the time as a management target may be changed in accordance with the number of registered users.

As for the predetermined user and the specific portable terminal device 200, the setter 240 may set, as the predetermined user, a user who is managed regardless of the presence or absence of the most recent usage history and set, as the specific portable terminal device 200, the portable terminal device 200 possessed by the user.

Specifically, when the user is assumed to have a high frequency of use based on the past usage situation, the content of the job, the distance from the image-forming apparatus, etc., the user is likely to use the image-forming apparatus afterward even though the most recent usage history is not present; therefore, the user is set as the predetermined user and the specific portable terminal device 200 to be managed, and the behavior of the image-forming apparatus 10 is changed to prepare for use when the specific portable terminal device 200 approaches or leaves, which enables an efficient operation.

As the predetermined user and the specific portable terminal device 200, the setter 240 may set the user and the portable terminal device 200 possessed by the user to be excluded from the management target regardless of the presence or absence of the most recent usage history. By excluding a user who is assumed to have a low frequency of use from the management target, a change in the behavior is prevented even when the portable terminal device 200 possessed by the user who is assumed to have a low frequency of use approaches or leaves, and an unnecessary behavior change of the image-forming apparatus is prevented, which enables an efficient operation.

The change in the behavior of the image-forming apparatus 10 performed by the behavior changer 230 may be an operation to recover the image-forming apparatus 10 from the energy-saving operating state to the normal operating state or an operation for the user to log in to or log out of the image-forming apparatus 10. The energy-saving operating state (energy-saving operating mode) is, for example, an operating state in which a minimum necessary power is supplied to the controller and the power supply to the CPU and a fixing device is stopped.

Figure 3:
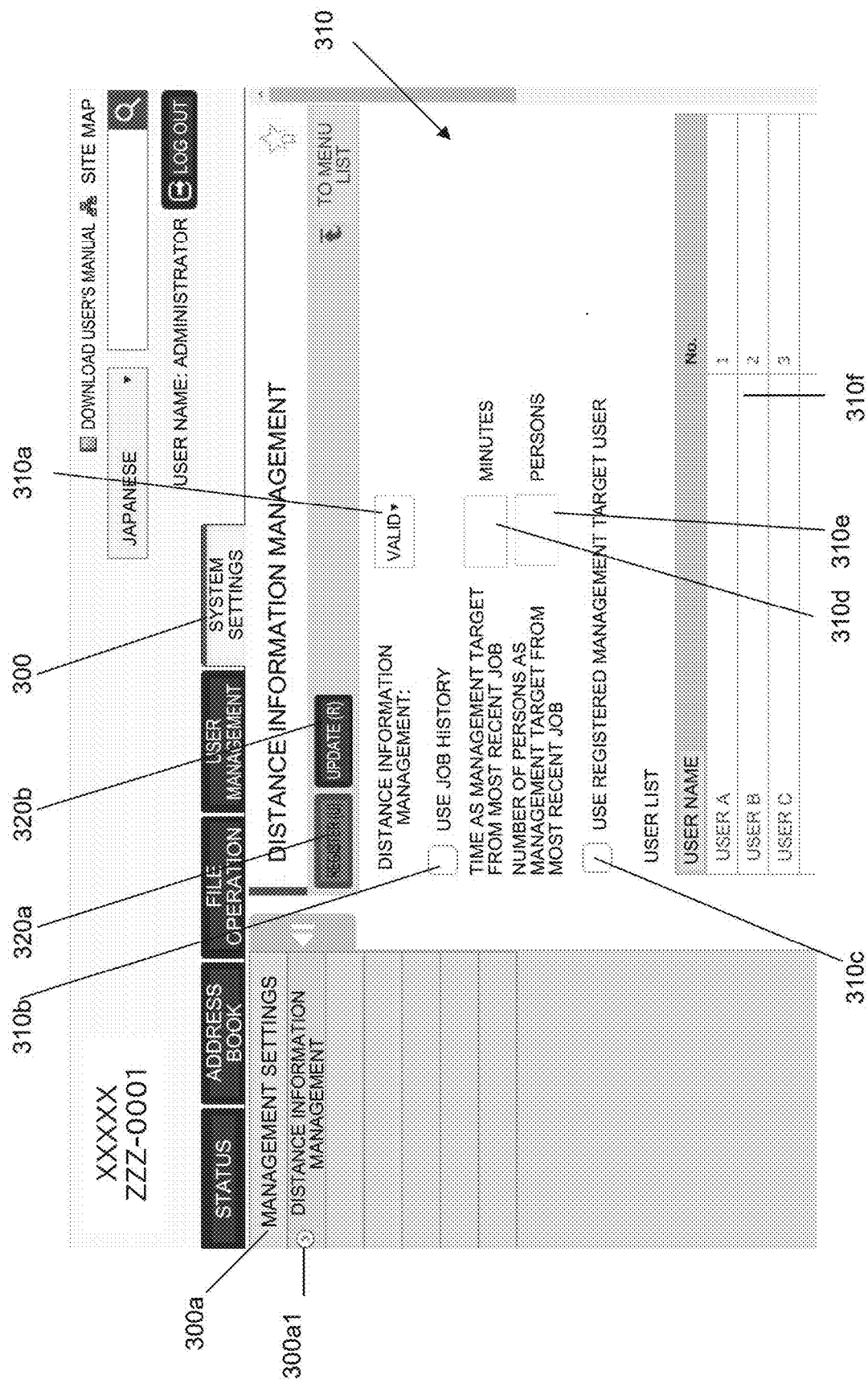
FIG. 3 is a schematic diagram of an operation.

FIG. 3 illustrates a specific example of a setting screen for a predetermined number of users and a time as a management target with regard to the settings of the setter 240.

As illustrated in FIG. 3, on the display screen displayed on the display 150 operable by an operation of the operator 140, a tab 300 of the system settings is selected, and distance information management 300a1 is selected from selection items of management settings 300a so that a setting screen 310 of the distance information management is displayed.

On the setting screen 310 of the distance information management, "valid" is selected on a pull-down menu 310a for the distance information management so that the settings of the distance information management may be set to "valid".

The setting screen 310 displays a check box 310b for selecting whether to "use the job history (use the usage history)" and a check box 310c for selecting whether to "use the registered management target user". By checking the check boxes 310b and 310c, the management may use the most recent usage history (the most recently executed job history) and the registered management target user.

In a case where the check box 310b is checked, while a box 310d for setting the "time as the management target from the most recent job" and a box 310e for setting the "number of persons as the management target from the most recent job" are displayed on the setting screen 310 for the "management using the job history", the management time is input to the box 310d and the number of predetermined users is input to the box 310e so that "management using the job history" may be set.

When the check box 310c is checked, it is possible to "use the registered management target user". A predetermined user name (a user A, a user B, a user C, etc.) as a management target is input to a box 310f for inputting a user name of a management target user so that the predetermined user as a management target may be input.

A "register button" 320a displayed on the setting screen 310 is pressed so that the currently input settings are registered, and an "update button" 320b is pressed so that the input settings may be updated.

1.3 Process Flow

The flow of an operation in the image-forming apparatus 10 will be described based on the flowchart in FIG. 4. Step 100 and subsequent steps will be abbreviated as S100 and the like.

First, when the distance detector 210 detects the portable terminal device 200 that is present in the surroundings of the image-forming apparatus 10, it is determined whether the user possessing the portable terminal device 200 is a predetermined user to be managed based on the most recent usage history or whether the user is a predetermined user to be managed not based on the usage history (S100).

As a result of a determination, when the user possessing the portable terminal device 200 is a predetermined user to be managed based on the most recent usage history, or when the user is a predetermined user to be managed not based on the usage history, the portable terminal device 200 possessed by the user is the specific portable terminal device 200, and the distance from the image-forming apparatus 10 to the specific portable terminal device 200 is acquired from the distance detector 210 (S110).

Conversely, as a result of a determination at S100, when the user possessing the portable terminal device 200 is not a predetermined user to be managed based on the most recent usage history and is not a predetermined user to be managed not based on the usage history (S100: No), the distance information is not acquired (S120) and the process ends (end).

After the process at S110, it is determined whether a user is currently logged in to the image-forming apparatus 10 (S130). As a result of a determination, when the user is currently logged in to the image-forming apparatus 10, the approach detector 220 detects whether the specific portable terminal device 200 possessed by the predetermined user has moved away from the image-forming apparatus 10 and determines whether the predetermined user has left (S140).

When it is determined that leaving of the predetermined user has been detected (S140: Yes), a logout process is executed for the user currently logged in to the image-forming apparatus 10 or the energy-saving operating mode is entered (S150). In this case, when it is determined that leaving has been detected, it may be determined that the user's job has been completed, and therefore a logout process is executed for the user currently logged in to the image-forming apparatus 10, the operation of the image-forming apparatus 10 is stopped, or the energy-saving mode is set in which the power is fed only to necessary devices in a standby state. Then, the process ends (end).

Conversely, when it is determined at S140 that leaving of the predetermined user has not been detected (S140: No), the process ends (end).

When it is determined at S130 that the user is not currently logged in to the image-forming apparatus 10 (S130: No), it is determined whether the approach of the user has been detected from the approach of the portable terminal device 200 (S160). When the approach of the user has been detected (S160: Yes), the image-forming apparatus 10 is recovered from the energy-saving mode to the normal mode, or the user is prompted to log in to the image-forming apparatus 10 so that the image-forming apparatus 10 enters a usable state (S170). Then, the process ends (end).

When it is determined at S160 that the approach of the portable terminal device 200 has not been detected (S160: No), the process ends (end).

FIG. 5 is a schematic processing diagram of the image-forming apparatus according to an embodiment.

Figure 5A:
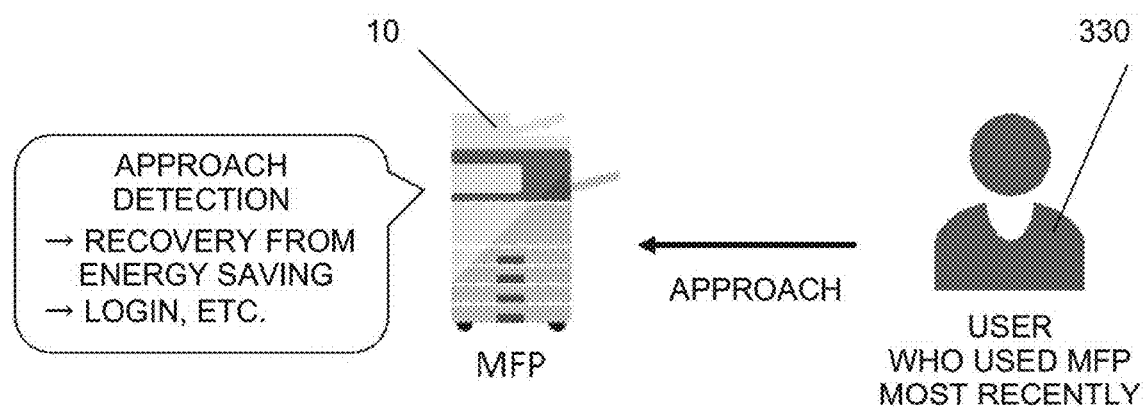
FIGS. 5A and 5B are schematic diagrams of a setting user interface.

By the process according to the embodiment, the behavior of the image-forming apparatus 10 may be changed by detecting the approach or leaving of the user who used the image-forming apparatus most recently or the target user for which the distance information is always managed. For example, as illustrated in FIG. 5(a), when a user 330 who used the image-forming apparatus most recently has approached the image-forming apparatus 10, the image-forming apparatus 10 side detects the approach of the user and changes its behavior, for example, recovers from the energy-saving operating state to the normal state or sets a login state of the user whose approach has been detected.

Figure 5B:
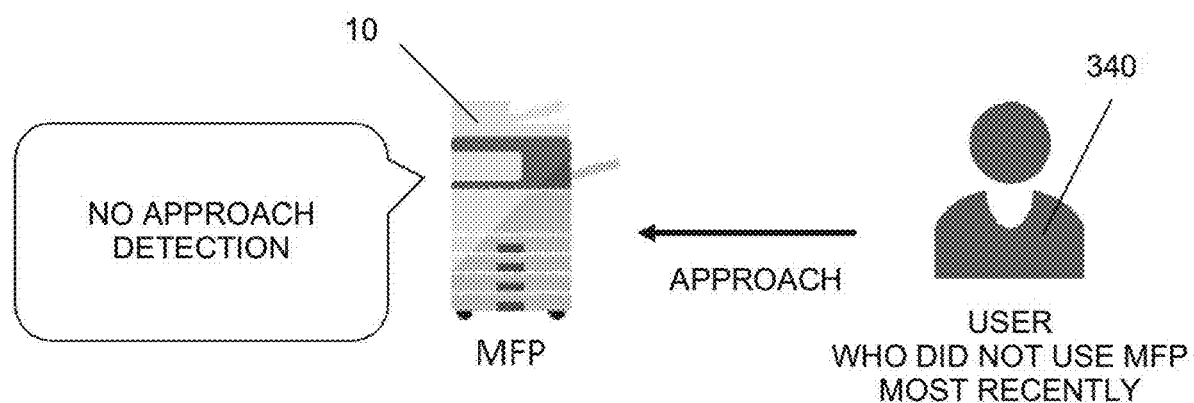

With regard to the user who did not use the image-forming apparatus most recently or the user for which the distance information is not managed, the image-forming apparatus 10 does not detect the approach to or leaving from the image-forming apparatus 10 and does not change its behavior. For example, as illustrated in FIG. 5(b), even when a user 340 who did not use the image-forming apparatus most recently has approached the image-forming apparatus 10, the image-forming apparatus 10 side does not detect the approach of the user. Therefore, the image-forming apparatus 10 does not change its behavior.

1.4 Advantageous Effects

As described above, according to the embodiment, in the operational environment where the behavior of the image-forming apparatus is changed in accordance with the movement of the user, a management is conducted for the distance information of at least one or more predetermined users who used the image-forming apparatus 10 or the approach or leaving of the target user for which the distance information is always managed, while no management is conducted for the distance information of other users; thus, it is possible to effectively prevent unnecessary behavior changes caused by the approach or leaving of a user other than the distance-information management target users.

Although the embodiment has been described above, the specific configuration is not limited to the embodiment, and designs, etc. without departing from the gist of the present invention are also included in the scope of claims.

According to the embodiment, a program working in each device is a program that controls a CPU or the like (a program that causes a computer to function) so as to perform the functions in the embodiment described above. Information processed by these devices is temporarily stored in a temporary storage device (e.g., a RAM) during processing, then stored in various storage devices such as a ROM or an HDD, and read and corrected/written by the CPU as needed.

Here, the recording medium storing the program may be any non-transitory recording medium such as a semiconductor medium (e.g., a ROM or a non-volatile memory card), an optical recording medium/magnetic optical recording medium (e.g., a digital versatile disk (DVD), a magneto optical disc (MO), a MiniDisc (MD), a compact disc (CD), a BD, etc.), or a magnetic recording medium (e.g., a magnetic tape or a flexible disk, etc.).

The functions in the above-described embodiment are performed by executing loaded programs, and also the functions of the present disclosure may be performed by processing in collaboration with the operating system, another application program, or the like, based on the instruction of the program.

When the program is distributed in the market, the program stored in a portable storage device may be distributed or the program may be transferred to a server computer connected via a network such as the Internet. In this case, obviously, a storage device of the server computer is also included in the present invention.

All or some of the devices according to the above-described embodiment may be implemented as large scale integration (LSI), which is typically an integrated circuit. The respective functional blocks of the devices may be individually formed as a chip or may be partially or entirely integrated and formed as a chip. The method for forming an integrated circuit is not limited to LSI, but may also be implemented by a dedicated circuit or general-purpose processor. It is obvious that, when the progress of the semiconductor technology causes a technology of forming an integrated circuit in place of LSI, the integrated circuit by the technology may be used.

What is claimed is:

1. An image-forming apparatus comprising:
a controller; and
a communicator, wherein
the controller is configured to:
detect a portable terminal device;
determine whether or not a user possessing the portable terminal device is a predetermined user;
when the user possessing the portable terminal device is the predetermined user,
detect distance information of the image-forming apparatus with respect to the portable terminal device based on communication with the portable terminal device using the communicator;
determine, based on the detected distance information, whether the portable terminal device is approaching the image-forming apparatus or moving away from the image-forming apparatus; and
change a behavior of the image-forming apparatus according to the determination,
wherein
when the user possessing the portable terminal device is not the predetermined user, the controller refrains from detecting the distance information of the image-forming apparatus with respect to the portable terminal device.

2. The image-forming apparatus according to claim 1, wherein the predetermined user is set based on a usage history of the image-forming apparatus or as a user for which the distance information is managed regardless of presence or absence of the usage history.

3. The image-forming apparatus according to claim 2, wherein a limit is set on a number of predetermined users or a time for managing the usage history.

4. The image-forming apparatus according to claim 1, wherein a target excluded from a management target regardless of presence or absence of a most recent usage history is settable as the predetermined user and the portable terminal device.

5. The image-forming apparatus according to claim 1, wherein a change in the behavior of the image-forming apparatus by the controller is an operation to recover the image-forming apparatus from an energy-saving operating state to a normal operating state or an operation for a user to log in to or log out of the image-forming apparatus.

6. The image-forming apparatus according to claim 1, wherein the predetermined user is a most recent user.

7. The image-forming apparatus according to claim 1, wherein the predetermined user is a management target user.

8. An information processing system comprising a portable terminal device and an image-forming apparatus, wherein
the image-forming apparatus includes:
a controller; and
a communicator, wherein
the controller is configured to:
detect a portable terminal device;
determine whether or not a user possessing the portable terminal device is a predetermined user;
when the user possessing the portable terminal device is the predetermined user,
detect distance information of the image-forming apparatus with respect to the portable terminal device based on communication with the portable terminal device using the communicator;
determine, based on the detected distance information, whether the portable terminal device is approaching the image-forming apparatus or moving away from the image-forming apparatus; and
change a behavior of the image-forming apparatus according to the determination,
wherein
when the user possessing the portable terminal device is not the predetermined user, the controller refrains from detecting the distance information of the image-forming apparatus with respect to the portable terminal device.

9. A method for controlling an image-forming apparatus, the method comprising:
detecting a portable terminal device;
determining whether or not a user possessing the portable terminal device is a predetermined user;
when the user possessing the portable terminal device is the predetermined user,
detecting distance information of the image-forming apparatus with respect to the portable terminal device based on communication with the portable terminal device;
determining, based on the detected distance information, whether the portable terminal device is approaching the image-forming apparatus or moving away from the image-forming apparatus; and changing a behavior of the image-forming apparatus according to the determination, wherein when the user possessing the portable terminal device is not the predetermined user, the controller refrains from detecting the distance information of the image-forming apparatus with respect to the portable terminal device.

* * * * *